United States Patent [19]

Abitbol et al.

[11] Patent Number: 5,784,282

[45] Date of Patent: Jul. 21, 1998

[54] METHOD AND APPARATUS FOR IDENTIFYING THE POSITION IN THREE DIMENSIONS OF A MOVABLE OBJECT SUCH AS A SENSOR OR A TOOL CARRIED BY A ROBOT

[75] Inventors: Marc Abitbol, Jerusalem, Israel; Jean-Luc Maillart, Bouc-Bel-Air, France

[73] Assignees: Bertin & Cie, Plaisir Cedex; Sollac, Puteaux, both of France

[21] Appl. No.: 381,999

[22] PCT Filed: Jun. 10, 1994

[86] PCT No.: PCT/FR94/00687

§ 371 Date: Jun. 8, 1995

§ 102(e) Date: Jun. 8, 1995

[87] PCT Pub. No.: WO94/29774

PCT Pub. Date: Dec. 22, 1994

[30] Foreign Application Priority Data

Jun. 11, 1993 [FR] France .................. 93 07032

[51] Int. Cl.[6] .............. G05B 19/18; G06F 19/00; G06G 7/64; G06G 7/66

[52] U.S. Cl. .............. 364/474.28; 364/167.07; 364/474.34; 395/94; 901/47

[58] Field of Search .............. 364/167.01, 474.28, 364/474.34; 395/86, 89, 90, 94; 318/567; 348/95; 901/47

[56] References Cited

U.S. PATENT DOCUMENTS

| | | | |
|---|---|---|---|
| 4,821,206 | 4/1989 | Arora | 364/513 |
| 4,831,549 | 5/1989 | Red et al. | 364/513 |
| 4,835,710 | 5/1989 | Schnelle et al. | 364/513 |
| 4,851,905 | 7/1989 | Pryor | 358/125 |
| 4,908,951 | 3/1990 | Gurny | 33/503 |
| 4,969,108 | 11/1990 | Webb et al. | 364/513 |
| 5,251,156 | 10/1993 | Heier et al. | 364/559 |
| 5,255,096 | 10/1993 | Boyle | 358/93 |
| 5,267,143 | 11/1993 | Pryor | 364/167.01 |
| 5,297,238 | 3/1994 | Wang et al. | 395/94 |
| 5,436,542 | 7/1995 | Petelin et al. | 318/567 |
| 5,576,948 | 11/1996 | Stern et al. | 364/167.01 |

FOREIGN PATENT DOCUMENTS

| | | |
|---|---|---|
| 114505 | 8/1984 | European Pat. Off. . |
| 151417 | 8/1985 | European Pat. Off. . |
| 2669257 | 5/1992 | France . |

OTHER PUBLICATIONS

Chen, C. et al., *A New Robotic Hand/Eye Calibration Method by Active Viewing of a Checkerboard Pattern*, Proceedings of the International Conference on Robotics and Automation, Institute of Electrical and Electronics Engineers, Atlanta, GA, May 2–6, 1993, pp. 770–775.

Puget, P. et al., *An Optimal Solution for Mobile Camera Calibration*, Proceedings of the 1990 IEEE International Conference on Robotics and Automation, Cincinnati, OH, pp. 34–39.

Jiang, B.C. et al., *A Review of Recent Developments in Robot Metrology*, Journal of Manufacturing Systems, vol. 7, No. 4, 1988, pp. 339–357.

*Primary Examiner*—Reba I. Elmore
*Assistant Examiner*—Sheela S. Rao
*Attorney, Agent, or Firm*—Bell Seltzer Intellectual Property Law Group of Alston & Bird, LLP

[57] ABSTRACT

A method and apparatus for identifying the position of an object that is movable in a determined three-dimensional zone by means of a video camera (20) or the like mounted on the movable object (14), the camera (20) being capable of being swivelled to sight targets (22) disposed around the movable object (14) and to enable the position and the orientation of said object to be determined accurately by triangulation. The invention is particularly applicable to accurately determining the position and the orientation of a sensor or a tool mounted on a robot.

14 Claims, 3 Drawing Sheets

METHOD AND APPARATUS FOR IDENTIFYING THE POSITION IN THREE DIMENSIONS OF A MOVABLE OBJECT SUCH AS A SENSOR OR A TOOL CARRIED BY A ROBOT

FIELD OF THE INVENTION

The invention relates to a method and to apparatus for identifying the position in three dimensions of a movable object such as a sensor or a tool carried, e.g. by a robot so as to be displaceable in a given three-dimensional volume or zone.

BACKGROUND OF THE INVENTION

When it is desired to know accurately the position and the orientation of a sensor or of a tool mounted on a robot, the position and the orientation of the robot or the displacement thereof cannot be established with sufficient accuracy for it to be possible to deduce therefrom by computation the position and the orientation of the sensor or of the tool, and for that purpose it is necessary to use means that are relatively very sophisticated and expensive.

For example, it is necessary to dispose around the displacement zone of the robot at least two systems for sighting a reference mark or target provided on the robot. When high accuracy is required, then use is made of theodolites, which are devices that are very expensive and difficult to operate.

SUMMARY OF THE INVENTION

A particular object of the present invention is to avoid those drawbacks of the prior art.

The present invention provides a method and apparatus for identifying the position of a movable object by triangulation, enabling great accuracy to be obtained, comparable to that which would be obtained by using theodolites, but requiring only one quite cheap sighting system.

To this end, the invention provides a method of identifying the position in three dimensions of a movable object, e.g. such as a sensor or a tool carried by a robot, the method being characterized in that it consists in swivel-mounting a photosensitive detector such as a video camera, e.g. of the CCD type, on the movable object so as to be capable of being swivelled about at least one axis on said object, using the detector to sight targets disposed at predetermined locations relative to the displacement zone of the movable object, determining the positions of the optical axis of the detector that correspond to the sighted targets, and deducing therefrom the accurate position and orientation of said movable object by triangulation.

The invention thus differs from the prior art essentially in that the aiming system is on-board the movable object, and in that it is constituted by a CCD video camera, e.g. a monochrome camera, which constitutes a device that is reliable and quite cheap, or it may optionally be constituted by a four-quadrant detector.

Advantageously, the detector is rotatable stepwise about the, or each, above-specified axis, to occupy predetermined angular positions, each of which is defined with a high degree of repeatability.

It is then possible by a prior calibration operation to define accurately the direction of the optical axis of the detector in each of the predetermined angular positions thereof.

It is also possible by means of another calibration operation to determine accurately the parameters specific to the means for swivelling the detector.

The invention also provides apparatus for identifying the position in three dimensions of a movable object, e.g. such as a sensor or a tool carried by a robot, the apparatus being characterized in that it comprises a photosensitive detector such as a video camera, e.g. of the CCD type, carried by the movable object and capable of being swivelled on said object about at least one axis, means for determining the angular position of the detector about said axis, targets disposed in predetermined locations relative to the displacement zone of the movable object, and data processing means connected to the above-specified detector to receive signals corresponding to said targets sighted by the detector and to deduce therefrom the accurate position and orientation of said movable object by triangulation.

Advantageously, the apparatus also comprises motorized means for stepwise rotation of the detector, enabling the detector to be moved into angular positions that are defined with a high degree of repeatability.

The targets which are preferably located outside the displacement zone of the movable object, and for example around this zone, comprise panels carrying a series of reference marks, formed at predetermined intervals from one another.

Advantageously, each target comprises at least two types of reference mark, said marks being constituted, for example, by balls or spheres made of materials having different capacities of light reflection or diffusion.

In general, the invention which enables the position of an object that is movable in a given three-dimensional zone to be identified accurately is equally applicable to fine correction of the position and/or the orientation of a sensor or of a tool carried by a robot, and to mutual recalibration of data provided sequentially by a movable sensor carried by a robot.

The invention will be better understood and other characteristics, details, and advantages thereof will appear more clearly on reading the following description given by way of example and made with reference to the accompanying drawings, in which:

DETAILED DESCRIPTION

Figure 1:
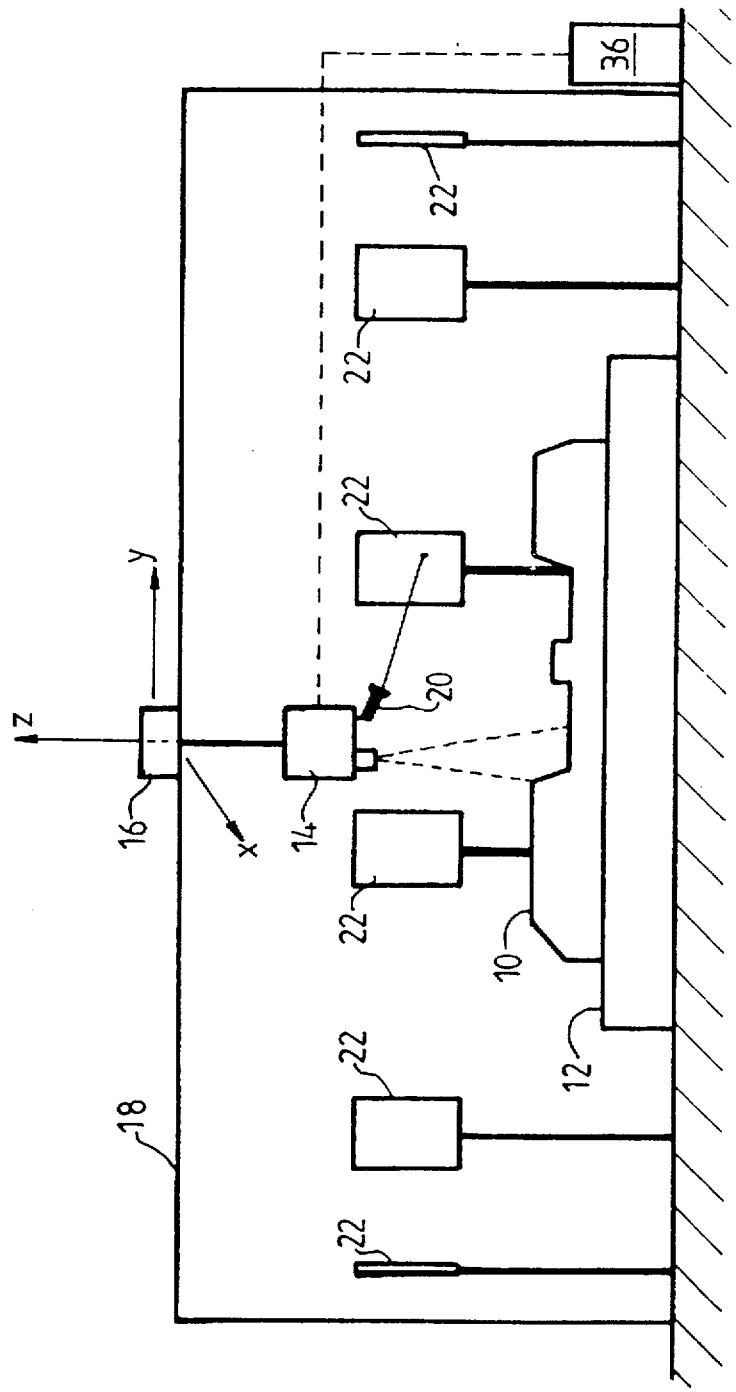
FIG. 1 is a diagrammatic view of apparatus of the invention.

Reference is made initially to FIG. 1 which illustrates a particular application of the invention that consists in determining optically and without making contact the three-dimensional shape of an object 10 that is placed on a reference surface 12, the device of the invention comprising an optical sensor 14 that is displaceable over the object 10 along three orthogonal axes x, y, and z, the sensor being carried, for example, by a carriage 16 that is displaceable along a gantry 18 and that includes motorized means for displacing the sensor 14 along the axes x, y, and z.

Measurements of the surface of the object 10 as provided sequentially by the sensor 14 must be mutually recalibrated or positioned with great accuracy when it is desired to obtain accurate information about the entire visible surface of the object 10. This recalibration is possible only if the position and the orientation of the sensor 14 relative to a fixed reference frame are known.

In the prior art, this was achieved by means of theodolites disposed around the reference surface 12 for sighting a reference mark formed on the housing of the sensor 14. As already mentioned, such theodolites are extremely expensive and relatively inconvenient to use.

The invention makes it possible to obtain a result that is similar or equivalent by means of a photosensitive detector such as a video camera 20 which is mounted to swivel about at least one axis on the housing of the sensor 14, and by means of targets 22 which are disposed at predetermined locations relative to the displacement zone of the sensor 14, and which may, for example, be distributed around at least a portion of the reference surface 12.

By using the camera 20 to sight three targets 22 in succession, and by determining on each occasion the point of intersection between the optical axis of the camera and the corresponding target 22, it is possible by triangulation to determine the position and the orientation of the three-dimensional sensor 14.

The same result could be achieved by replacing the video camera with a four-quadrant detector.

In any event, it is essential for the locations and the orientations of the targets 22 to be known with very great accuracy.

Figure 2:
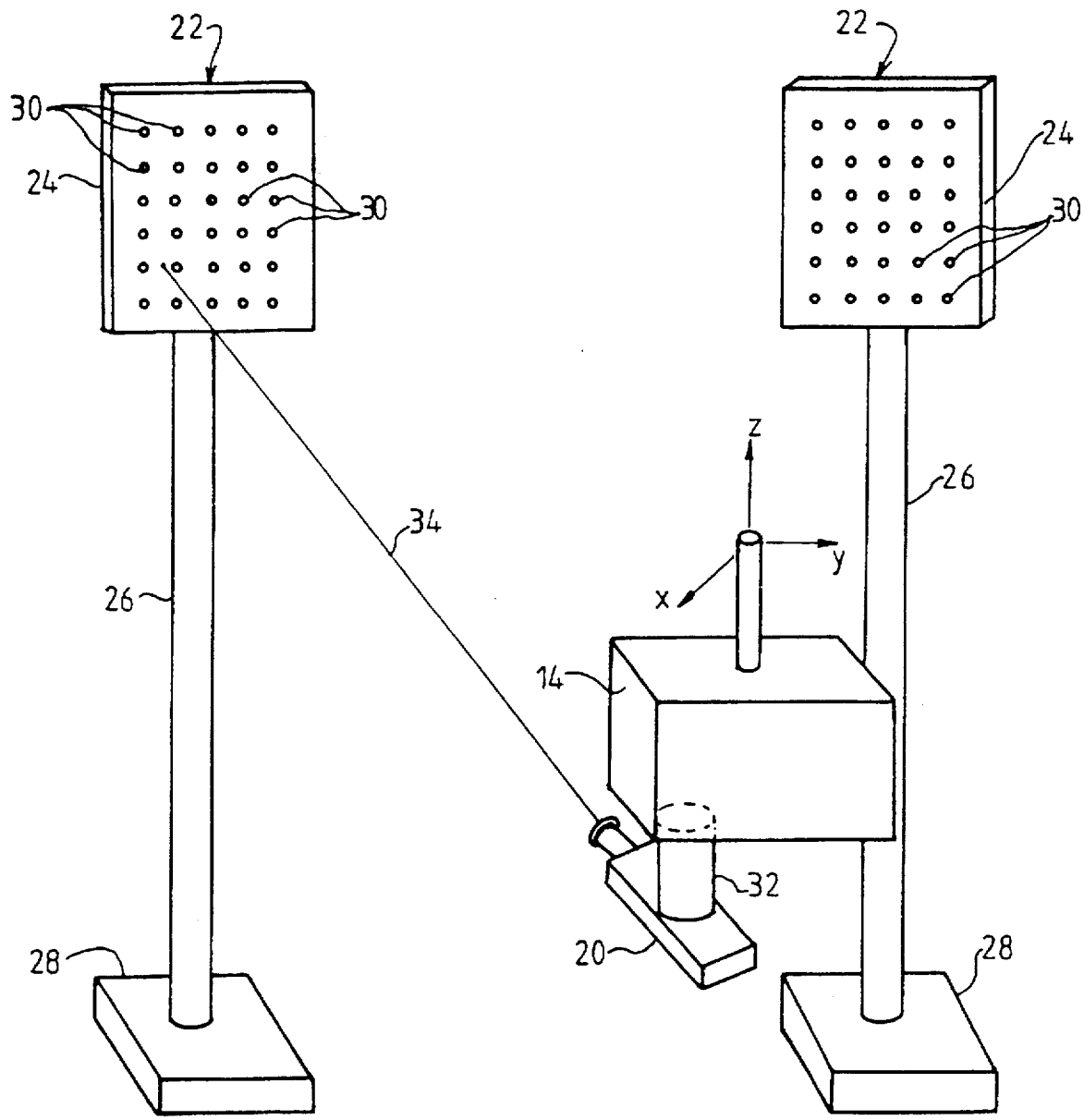
FIG. 2 is a perspective view illustrating the principle on which the invention is based.

As shown in the example of FIG. 2, the targets 22 may be constituted by plane panels 24 carried by rigid uprights 26 anchored in the ground by means of stands 28, various means being provided to prevent or limit as much as possible any vibration of the uprights 26 and of the panels 24.

Each panel 24 carries a series of reference marks constituted in this case by balls or spheres 30 disposed in horizontal rows and in vertical columns on a face of the panel 24 and spaced apart from one another at predetermined intervals. The balls or spheres 30 are preferably made of a diffusing material such as a polished ceramic that diffuses light uniformly in all directions, so that the center of the light spot formed by the image of a ball on the array of sensors in the camera 20 coincides with the center of the ball. It is also possible to provide for some of the balls or spheres 20, e.g. those located in the four corners of a panel 24, to be made of a different material, e.g. a reflecting material, so as to enable them to be identified on the basis of the light flux that they transmit towards the camera 20.

Means for lightning the targets 22, such as halogen lamps, may be provided in fixed manner on the site, however they are preferably mounted on the housing of the camera 20 so as to follow the movements thereof.

It is also necessary to determine with great accuracy the position and the orientation of the optical axis of the camera 20 relative to the housing of the sensor 14. For this purpose, it is advantageous to mount the camera 20 on the housing of the sensor 14 via a motorized support 32 for imparting discrete or stepwise rotation, thereby enabling the camera 20 to be moved into predetermined angular positions with a high degree of repeatability. Such motorized supports, e.g. of the notched turntable type and enabling the camera 20 to be swivelled about two perpendicular axes, are commercially available (e.g. the two-axis support sold by Renishaw, having 720 indexable positions defined with repeatability accurate to within plus or minus 5 μrad).

Figure 3:
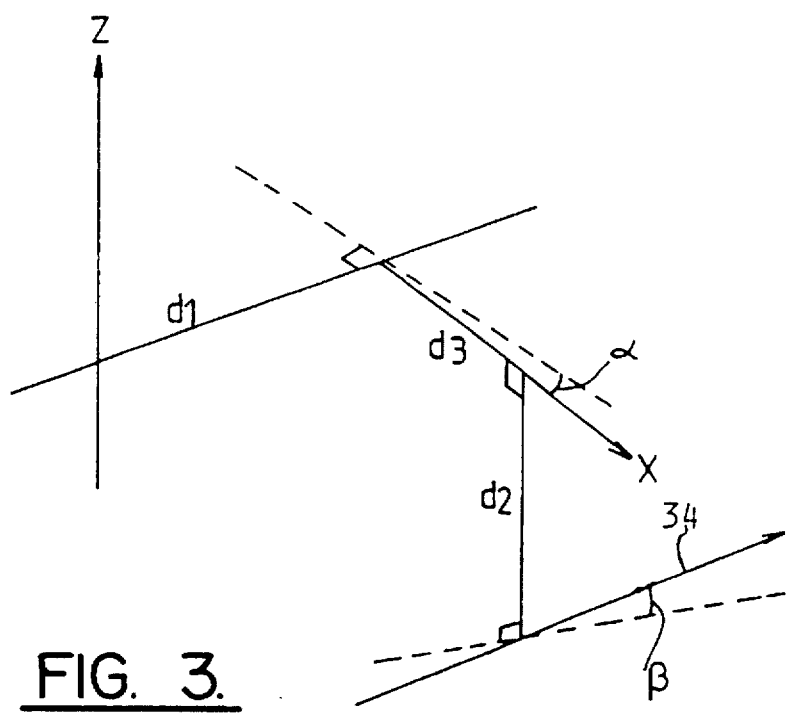
FIG. 3 is a diagram in perspective and on a larger scale of the means for orienting a video camera that is used in the apparatus of the invention.

In practice, and as shown diagrammatically in FIG. 3, the two axes of rotation of the camera 20 and its optical axis are neither exactly perpendicular nor are they exactly concurrent.

In FIG. 3, references Z and X designate the two axes of rotation of the camera 20, reference 34 designates the optical axis of the camera, $d_1$ is the distance between the axes of rotation Z and X, $d_2$ is the distance between the axis of rotation X and the optical axis 34 of the camera, $d_3$ is the distance between the intersections on the axis X of the segments that carry $d_1$ and $d_2$, $\alpha$ is the orthogonal error between the axis X and the axis Z, and $\beta$ is the orthogonal error between the optical axis 34 and the axis X, the true normals to the axes X and Z being drawn in dashed lines. By knowing the values of these parameters $d_1$, $d_2$, $d_3$, $\alpha$, and $\beta$, it is possible to correct the measurements made when the camera 20 sights the targets 22.

To determine the values of these parameters, it is possible to use a target of the same type as the above-mentioned targets 22, i.e. a plane panel carrying rows and columns of balls constituting reference marks, and by proceeding as follows:

With the housing of the sensor 14 being in arbitrary position and orientation, the panel is placed in front of the camera and the camera is used to sight a plurality of zones of the ball panel, and on each occasion the coordinates of the intersection between the optical axis of the camera and the panel is determined. Thereafter, the sensor 14 is displaced so as to bring it into a new position, and a plurality of different points on the panel are again sighted with the camera 20, and so on. In theory, six different sightings of the panel by the camera 20 in any one given position of the sensor 14 suffice to fully define the position and the orientation of the sensor 14 and the values $d_1$, $d_2$, $d_3$, $\alpha$, and $\beta$. The position of the housing of the camera 14 is defined by three parameters, its orientation is defined by three more parameters, and the parameters associated with the structure of the system for swivelling the camera 20 are five in number (or possibly six). Each sighting by the camera 20 provides two values, such that six sightings for a given position of the sensor 14 suffice to define all of the looked-for parameters. To increase accuracy, a larger number of measurements are taken with the sensor occupying different positions.

Once the values of the parameters specific to the support 32 for the camera have been defined accurately, it is still necessary to determine the relative positions of the optical axis 34 of the camera 20 in all of the angular positions that it is capable of taking up. This calibration is performed by means of a three-dimensional measuring machine (e.g. "M.M.T.") for "feeling" the position of the camera in all possible angular orientations. Such mechanical measurement is performed, for example, at two points on the camera so as to define a leading vector with an angular accuracy of ± 5 μrad.

It is also possible to define the positions of the targets in the same way. For example, the plane panel carrying reference marks that was used for determining the parameters specific to the swivel support of the camera is placed between the targets, the sensor 14 is caused to face the panel, at least three different zones of the panel are sighted by means of the camera 20 with the results of the sightings being recorded, thereby making it possible to define the relative position and orientation of the sensor 14, as many of the targets 22 as possible are sighted with the camera 20, and then the sensor 14 is displaced and all of the above-specified operations are repeated. Once each target 22 has been sighted three times in this way by the camera 20, its six position and orientation coordinates can be completely defined.

In a variant, it is also possible to position the sensor 14 relative to the targets 22, to use the camera 20 for sighting as many of the targets as possible, to displace the sensor 14 and to sight the targets again with the camera 20, and so on, until at least as many equations have been obtained as there are unknowns. In this variant, it is not necessary to use the plane reference panel, thereby increasing the speed of operations and facilitating possible automation thereof.

The panel carrying the reference marks used for determining the specific parameters of the swivel support of the camera can also be used for calibrating the sensor 14. For this purpose, the panel is placed on the reference surface 12, the sensor 14 is brought over the panel, and the sensor is used to perform the measurements required for calibrating it. Simultaneously, it is also possible to sight the panel by means of the video camera 20 so as to establish a one-to-one relationship between the frame of reference tied to the sensor 14 and the frame of reference tied to the camera 20.

Once all of the above calibration operations have been performed, it is possible to place on the reference surface 12 an arbitrary object 10 whose three-dimensional shape is to be determined by means of the sensor 14, and the sensor 14 is displaced stepwise over the object 10 to acquire information relating to the entire surface of said object as visible to the sensor 14. In each position of the sensor, the video camera 20 is used to sight at least three different targets 22, thereby enabling the position and the orientation of the sensor 14 to be determined by triangulation.

All of the information acquired by the sensor and by the video camera 20 is transmitted to a data processing system designated by reference 36 in FIG. 1, which system can also be used to control the displacements of the sensor 14 over the object 10.

The position and the orientation of the sensor 14 is determined by triangulation as follows:

Each image of a target 22 as seen by the video camera 20 is transmitted in digital form to the data processing system 36 which accurately determines the center of said image on the target 22 on the basis of the centers of the images of the balls 30. These centers are themselves determined with better than pixel accuracy by application of the center-of-gravity technique. Linear interpolation also makes it possible to obtain accuracy that is considerably better than pixel pitch for the position of the center of the image. This makes it possible to determine the coordinates of the point of intersection of the optical axis of the camera 20 and the target 22. The angular positions of the camera about each of its axes of rotation are also known. Thus, by sighting three different targets 22 it is possible to completely define the six position and orientation coordinates of the sensor 14 in each of its information-acquisition positions.

By way of worked example, consider the targets 22 being placed at a distance of 1 to 3 meters from the camera 20 and each having an area of about 200 cm$^2$, each target carrying about 100 balls having a diameter of 3 mm and spaced apart from one another at about 10 mm intervals. Under such conditions, a CCD type video camera 20 having 768×572 pixels and fitted with a lens having a focal length of 80 mm provides accuracy of the order of 40 µm and 20 µrad respectively on the position and the orientation coordinates as determined for the sensor 14. The coordinates can be computed in real time by the data processing system 36, and the time required for computation is less than 1 second when an IBM PC-type microcomputer is used.

We claim:

1. A method of identifying the position in three dimensions of a movable object carried by a robot, the method comprising the steps of:

swivel-mounting a photosensitive detector on the movable object so as to be capable of being swivelled about at least one axis on said object, the detector having an optical axis;

sighting with the detector targets disposed at predetermined known locations relative to a displacement zone of the movable object, the targets being sighted by swivelling the detector about said axis on the movable object without displacing the movable object from its position and the detector generating signals corresponding to images of the sighted targets;

detecting for each sighted target an angular position of the detector relative to the axis of the movable object;

determining from said signals and from said angular position the position of the optical axis of the detector for each sighted target;

and calculating the position and orientation of the movable object by triangulation from the positions of the optical axis of the detector.

2. A method according to claim 1, wherein said step of determining the position of the optical axis of the detector for each sighted target includes determining points of intersection of the optical axis of the detector and reference marks of the sighted targets and determining therefrom the positions, in three dimensions, of the optical axis of the detector.

3. A method according to claim 1, further comprising the step of determining parameters specific to means for swivelling the detector about the axis on the movable object to determine the position in three dimensions of the optical axis of the detector, said parameters comprising errors of concurrence and orthogonality between the optical axis of the detector and said axis on the movable object.

4. A method according to claim 3 wherein said detector is swivelled by a swivelling means and said method further comprises a prior calibration step during which parameters specific to said swivelling means are determined.

5. A method according to claim 1, wherein said step of swivelling the detector on the movable object includes rotating the detector in a stepwise manner about the axis on the movable object to occupy angular positions that are defined with a high degree of repeatability and the method further comprises the step of providing a prior calibration operation during which relative positions of the optical axis of the detector are accurately determined for each of said angular positions of the detector.

6. A method according to claim 1, further comprising a prior calibration step during which positions and orientations of the targets are accurately determined by sighting each of the targets at least three times with the detector for different known positions of the movable object.

7. An apparatus for identifying the position in three dimensions of a movable object carried by a robot, the apparatus comprising a photosensitive detector which has an optical axis and which is carried by the movable object, means for swivelling the detector on said object about at least one axis, means for determining the angular position of the detector about said axis, targets disposed at determined known locations relative to a displacement zone of the movable object, control means for swivelling the detector in different angular positions about said axis to sight different targets without displacing the movable object, and data processing means connected to the detector to receive therefrom signals corresponding to images of said targets sighted by the detector when the movable object is not displaced from its position, wherein the position and orientation of said movable object are determined by triangulation utilizing said positions of the optical axis of the detector.

8. An apparatus according to claim 7, wherein the detector is rotatably displaceable about two perpendicular axes on said movable object.

9. An apparatus according to claim 7, wherein the detector is displaceable in stepwise rotation to occupy predetermined angular positions about said axis, said angular positions being defined with a high degree of repeatability.

10. An apparatus according to claim 7, wherein the targets are located outside the displacement zone of the movable object.

11. An apparatus according to claim 7, wherein the targets comprise panels carrying a series of reference marks formed at predetermined intervals relative to one another.

12. An apparatus according to claim 11, wherein each target includes two types of reference marks.

13. An apparatus according to claim 11, wherein the reference marks are spheres made of materials having determined capacities for reflecting and diffusing light.

14. An apparatus according to claim 7, wherein the targets are mounted in fixed manner on rigid supports that include means for absorbing vibration.

* * * * *